US008015189B2

(12) United States Patent
Naaman

(10) Patent No.: US 8,015,189 B2
(45) Date of Patent: Sep. 6, 2011

(54) CUSTOMIZABLE CONNECTIONS BETWEEN MEDIA AND META-DATA VIA FEEDS

(75) Inventor: Mor Naaman, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 390 days.

(21) Appl. No.: 11/557,899

(22) Filed: Nov. 8, 2006

(65) Prior Publication Data
US 2008/0126388 A1 May 29, 2008

(51) Int. Cl.
G06F 7/00 (2006.01)
(52) U.S. Cl. .................. 707/740; 348/231.5
(58) Field of Classification Search ............ None
See application file for complete search history.

(56) References Cited

U.S. PATENT DOCUMENTS

| | | | |
|---|---|---|---|
| 6,629,100 B2 * | 9/2003 | Morris et al. | 707/10 |
| 7,403,225 B2 * | 7/2008 | Singh | 348/231.5 |
| 2003/0081126 A1 * | 5/2003 | Seaman et al. | 348/207.1 |
| 2003/0135494 A1 * | 7/2003 | Phelan et al. | 707/3 |
| 2004/0047606 A1 * | 3/2004 | Mikawa | 386/95 |
| 2004/0126038 A1 * | 7/2004 | Aublant et al. | 382/305 |
| 2004/0174434 A1 * | 9/2004 | Walker et al. | 348/211.3 |
| 2005/0104976 A1 * | 5/2005 | Currans | 348/231.5 |
| 2007/0078857 A1 * | 4/2007 | Punaganti et al. | 707/10 |
| 2007/0118508 A1 * | 5/2007 | Svendsen | 707/3 |
| 2007/0127833 A1 * | 6/2007 | Singh | 382/254 |
| 2008/0027931 A1 * | 1/2008 | Lu et al. | 707/6 |

OTHER PUBLICATIONS

Ahern et al., "ZoneTag: Designing Context-Aware Mobile Media Capture to Increase Participation", Workshop on Pervasive Image Capture and Sharing, PICS 2006, Sep. 18, 2006.*
Toyama et al. "Geographic Location Tags on Digital Images", MM'03 Nov. 2-8, 2003, Berkeley, California.*
Davis et al. "From Context to Content: Leveraging Context to Infer Media Metadata", MM'04, Oct. 10-16, 2004, New York, New York.*
Naaman et al., "Context Data in Geo-Referenced Digital Photo Collections", MM'04, Oct. 10-16, 2004, discloses a system for annotating digital photo.*
Naaman, et al. "Automatic Organization for Digital Photographs with Geographic Coordinates" JCDL '04, Jun. 7-11, 2004.*
Yahoo Company, del.icio.us / help / tags, downloaded Jul. 17, 2006, http://del.icio.us/help.tags.
Yahoo Company, flickr, Yahoo Company, downloaded Jul. 17, 2006, http://flickr.com/help/tags#37.
Yahoo Company, del.icio.us / help / bundles, downloaded Jul. 17, 2006, http://del.icio.us/help/bundles.
Yahoo Company, del.icio.us / help / for, downloaded Jul. 17, 2006, http://del.icio.us/help/for.
Sarvis and Herrate et al., Metadata Creation System for Mobile Images, *MobiSys '04*, Jun. 6-9, 2004, Boston, MA, 2004; pp. 36-48.

* cited by examiner

*Primary Examiner* — Vei-Chung Liang
(74) *Attorney, Agent, or Firm* — Weaver Austin Villeneuve & Sampson LLP

(57) ABSTRACT

Meta-data from any meta-data source or feed, whose selection is customizable, is associated with media objects, such as photographs or video. In specific example embodiments, the meta-data from the custom-selected feeds are used to provide selectable feed tags that can be used to tag media objects. An architecture is provided that allows any combination of feeds to be selected for creation of a custom set of selected feeds that are to be used as sources of feed tags for media objects, and this custom set of selected feeds is extensible. In specific applications, different sets of feeds and feed tags may be utilized for facilitating the annotation of media objects.

33 Claims, 6 Drawing Sheets

CUSTOMIZABLE CONNECTIONS BETWEEN MEDIA AND META-DATA VIA FEEDS

BACKGROUND OF THE INVENTION

The present invention relates generally to manipulation of media objects or the like, such as photographs, video, audio files, and websites. More particularly, it relates to associating a tag with a media object.

Media capture does not happen in a void. When people take a photograph or capture video, the media usually can be thought of as having a connection to some other object. This other object may be captured in the media (e.g., a person), exist in the context of the photo (e.g., name of venue or event), or be present in other types of meta-data (e.g., weather data at the photo capture time and location, user tags). Conventionally, a user can post-process the media to then solidify a connection between their media to these other objects, e.g., by tagging the photo with a custom tag. However, the user may not be aware of all the other objects that their media can be connected to or may not want to make the effort to determine connections between media and other objects.

Accordingly, improved mechanisms for associating media objects with related objects are needed. Additionally, it would be beneficial to facilitate the association of objects that a user may not be aware are related to such media object.

SUMMARY OF THE INVENTION

Accordingly, apparatus and methods for associating meta-data from any meta-data source or feed, whose selection is customizable, with media objects, such as photographs or video are provided. In specific example embodiments, the meta-data from the custom-selected feeds are used to provide selectable feed tags that can be used to tag media objects. An architecture is provided that allows any combination of feeds to be selected for creation of a custom set of selected feeds that are to be used as sources of feed tags for media objects, and this custom set of selected feeds is extensible. In specific applications, different sets of feeds and feed tags may be utilized for facilitating the annotation of media objects.

In one embodiment, a method for associating meta-data from one or more customized feeds with media objects is disclosed. A feed selection mechanism, for selecting one or more feeds that each provide periodic updates of a plurality of meta-data items that can describe a characteristic of a media object, is provided. The feed selection mechanism is adapted so that any feed that has a known format for its meta-data items (e.g., the format is known with respect to the feed selection mechanism) can be selected for use with a media object. An annotation mechanism, for associating one or more meta-data items from the one or more selected feeds with a media object, is also provided.

In another embodiment, the invention pertains to a device comprising a processor, memory, and a display. The processor and memory are configured for performing one or more of the above described operations. In one aspect, the device is in the form of a camera or camera-phone. In another embodiment, the invention pertains to at least one computer readable storage medium having computer program instructions stored thereon that are arranged to perform one or more of the above described operations.

These and other features will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, embodiments of the present invention allow a user to add one or more feed tag(s) to a media object, such as a digital photograph or video, obtained from one or more customizable feeds. A feed tag may be in the form of any annotation or label (e.g., text, symbol, or icon). The user who is selecting a particular set of feeds may be an automated entity or an actual person. The specific feed selection process may vary based on any suitable factors, such as user characteristics, media type, and environment in which the feed tagging mechanism is being implemented.

Although the following description is directed specifically to using feed tags for media type objects, such as photos, video, and audio files, it is noted that feed tags can be utilized for other types of objects, such as executable files, text documents, web pages, etc. Additionally, several example feed tags are described that are obtained from particular types of feeds. Of course, these examples are not meant to limit the scope of the invention to the described feeds or feed tags.

Figure 1:
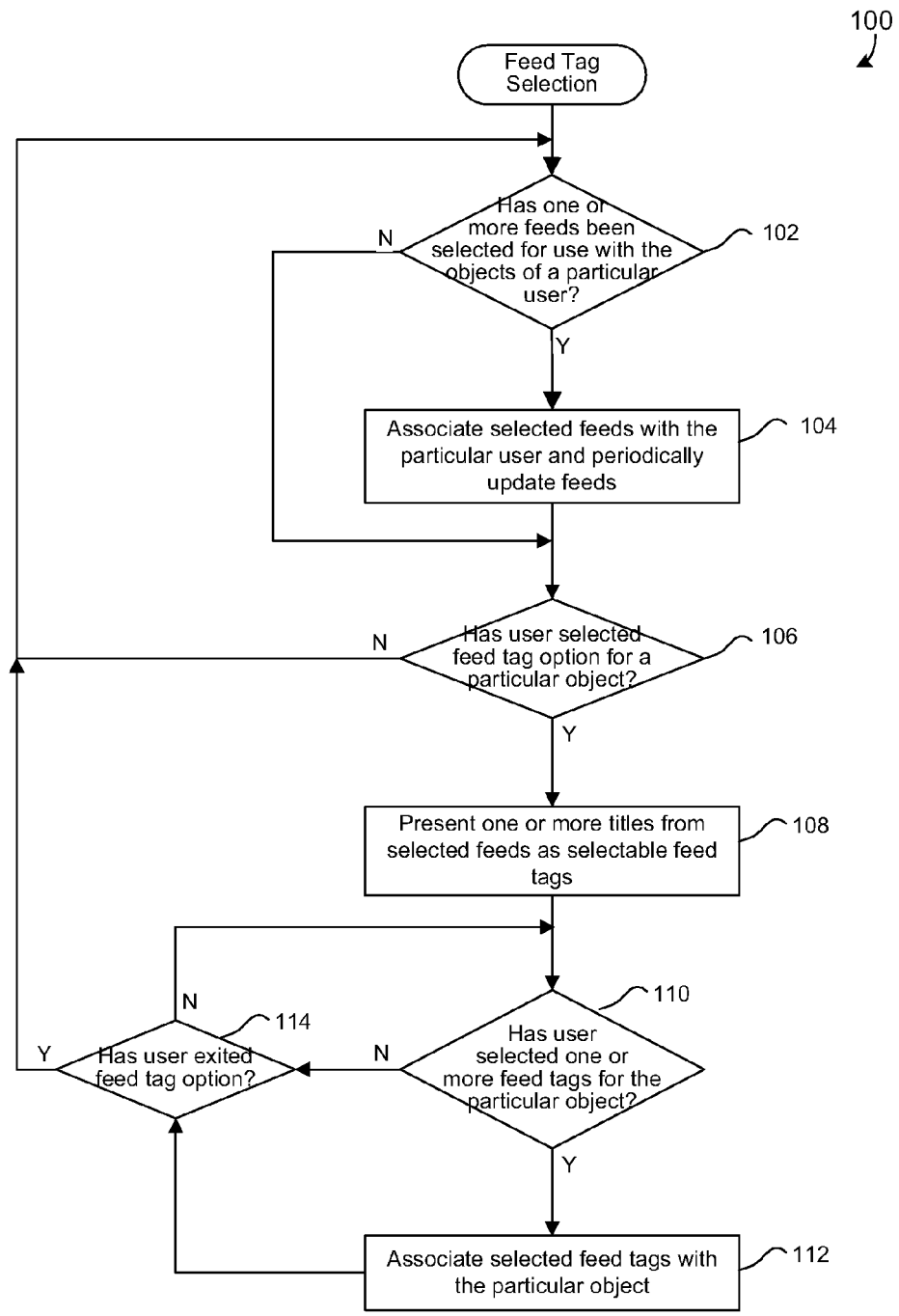
FIG. 1 is a flowchart illustrating a procedure for associating feed tags with a media object in accordance with one embodiment of the present invention.

FIG. 1 is a flowchart illustrating a procedure for associating feed tags with a media object in accordance with one embodiment of the present invention. Initially, it is determined whether one or more feeds have been selected for use with the objects of a particular user (or device) in operation 102. In general, any feed which can provide a meta-data source for media objects may be selected. For example, a feed that includes meta-data items having a known content and format may be selected for use with a media object if some of these meta-data items can provide a context for a media object.

For example, a selected feed may be an on-line calendar for an individual (e.g., the user) or a group of people that provides a source of meta-data in the form of event information of such individual or group. The group of people may be a select private group of people or a public group, e.g., the scheduled event for a particular local area. Examples of on-line calendar or scheduling service, to which the user subscribes, are Upcoming.org available from YAHOO! Inc. of Sunnyvale, Calif. or GOOGLE CALENDAR available from Google Inc. of Mountain View, Calif., or any other calendar service that utilizes a known format such as iCalendar. The iCalendar format is further described in "Internet Calendaring and Scheduling Core Object Specification (iCalendar) by F. Dawson et al., IETF (Internet Engineering Task Force), Request for Comments (RFC) 2445, (November 1998). A separate calendar application feed may be selected for each user or set of users. For example, a feed from the selecting user's on-line calendar application may be selected, and a second, different feed for the selecting user's friends from the same calendar application may also be selected, as shown below for FIG. 2B.

A trip planning application (e.g., Trip Planner available from YAHOO! Inc. of Sunnyvale, Calif.) for scheduling a sequence of planned travel locations for a user or group may also be selected as a feed. In another event feed example, a feed that posts scheduled events for a local geographical area (e.g., YAHOO! LOCAL, available from YAHOO! Inc. of Sunnyvale, Calif.) also may be selected. Any feed that lists specific places associated with the user or a geographical area, such as favorite restaurants of a user or of users from a local area, may also be selected as a source of meta-data for media objects, (e.g., YAHOO! LOCAL). A feed that provides meta-data about the user's local environment, such as a weather web page for the user's local area, may also be selected.

Figure 2A:
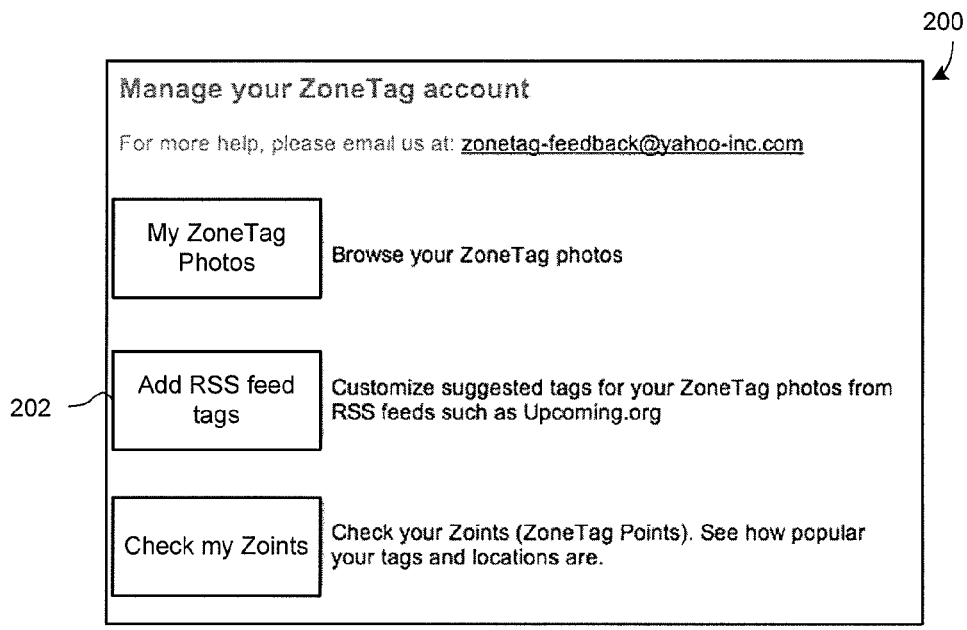
FIG. 2A is an example screen shot for initiating a feed selection mechanism in accordance with one embodiment of the present invention.

Any suitable feed selection mechanism may be utilized. The feed selection mechanism may allow a user to select feeds to be used for his media objects. The user may also be allowed to alter the set of feeds, e.g., remove and add feeds, which are used for his media objects. Although an RSS type feed is used to illustrate example techniques of the present invention, this is not meant to limit the scope of the invention and any suitable meta-data source format may used, such as Atom, iCal, or ant other forms of feeds. FIG. 2A is an example screen shot 200 for initiating an RSS feed selection mechanism in accordance with one embodiment of the present invention. As shown, a user may select an "Add RSS Feed Tags" input button 202. Alternatively, a user may select initiation of a feed selection mechanism by any other suitable input user interface, such as a pull-down menu, input box, etc. The RSS feed selection mechanism may also be configured with voice recognition for a user to select a feed by a voice command. In another embodiment, a predefined list of feeds may be presented to the user for selection, e.g., by checkbox or cursor selection.

Figure 2B:
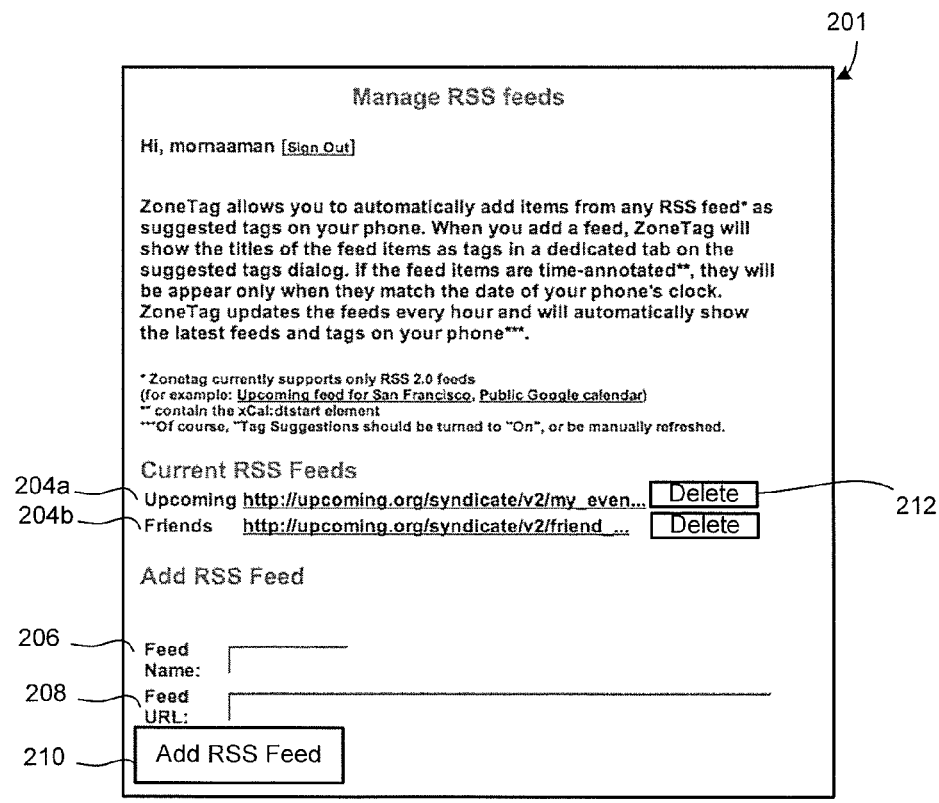
FIG. 2B is an example screen shot for adding an RSS feed in accordance with one application of the present invention.

When a user selects this "Add RSS Feed Tags" input button 202, the user may be presented with a user interface for adding an RSS feed. FIG. 2B is an example screen shot 201 for adding an RSS feed in accordance with one application of the present invention. As shown, the screen shot 201 for adding an RSS feed includes a list of currently selected RSS feeds 204a and 204b. The currently selected feeds 204 can now provide feed tags for the user's media objects. Each of these currently selected feeds 204 also is associated with a delete button, e.g., 212, for removing the selected feed.

The screen shot for adding an RSS feed 201 may also include a name input box 206 for entering an ASCII-numeric string of characters for the user to easily refer to a new feed, a feed URL input box 208 for entering the web link for the particular feed that the user wishes to select, and an "Add RSS Feed" button 210 for activating the newly entered feed for use with the user's media objects.

Alternatively, one or more feeds may be automatically selected without a user's manual selection. For instance, one or more default feeds that are applicable to any media objects may be automatically selected for each user. Examples of default feeds for automatic selection may include any source of environmental meta-data, such as a local weather web page or a local website for local events and/or places of interest. In a specific implementation, a user's identity can be linked to web services to which the user is subscribed, such as any of the services described herein. For example, a Yahoo user having a Yahoo! identity may subscribe to any number of Yahoo! services (available from Yahoo! Inc. of Sunnyvale, Calif.) which can be selected as feeds, such as Upcoming.org, Yahoo! Calendar, Yahoo! Local, Yahoo! Trip Planner, etc.

A particular user's searches, search results, or search result selections (e.g., scheduled events, physical or on-line locations, etc.) may also be used as a source of meta-data for associating with such user's media objects. In one implementation, when a particular user performs a search, the user's identity, search terms, search results, and which search results are selected by the particular user are stored. These stored search items can be used as a feed source, for example. The retained search information may provide meta-data, in the form of location and time events or links to such information, that can be associated with the user's media objects.

Once one or more feeds have been selected in operation 102 of FIG. 1, the selected feeds may then be associated with the user and periodically updated in operation 104. For instance, the selected feed URL's are stored on the user device and a request for such URL is periodically made to thereby retrieve meta-data in response to such request. The server for the selected feed may operate to compile the meta-data (e.g., for a particular user) and then send such compiled meta-data upon request (e.g., to an associated URL). Alternatively, the user's associated feed URL's may be stored on a remote device or server that is separate from the user device that is employed by the user to capture and/or handle media objects, and the meta-data for such feed URL is periodically retrieved for and stored on such remote device. The feed update may include retrieving the feed's URL and associated meta-data at any suitable frequency, such as once per hour. Alternatively, a feed update can be performed when the photograph is captured or when the user requests an update. In general, meta-data may be obtained for a selected feed by periodically querying a data source or by sending a single query or any number of queries to a data source.

It may then be determined whether the user has selected a feed tag option for a particular media object in operation 106. If a user has selected a feed tag option, one or more titles from the selected feeds are presented as selectable feed tags in operation 108. After feed tags are presented, it may then be determined whether the user has selected one or more feed tags for the particular object in operation 110. If the user has selected one or more feed tags, the selected feed tags are then associated with the particular object in operation 112. For instance, a data structure in formed to associate the selected feed tag with the particular media object. Otherwise if a feed tag is not selected, it may be determined whether the user has exited the feed tag option in operation 114. If the feed tag option has not been exited, the process may continue to wait for the user to select one or more feed tags in operation 110.

When the user exits the feed tag option, the feed tag procedure 100 may be repeated. The feed tag procedure 100 may also be repeated after it has been determined that the user has not selected the feed tag option in operation 106. Since the user may select a first or next feed at any time, the operation for determining whether the user has selected one or more feeds is preferably repeated at various times in the process so as to handle such feed selection.

Figure 2C:
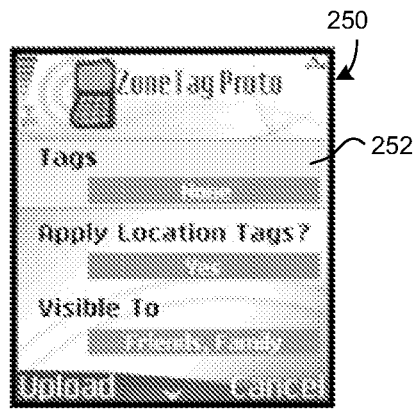
FIGS. 2C through 2E illustrate a plurality of screen shots from a feed tag application for allowing a user to associate one or more feed tags with a digital photo in accordance with a specific embodiment of the present invention.
Figure 2D:
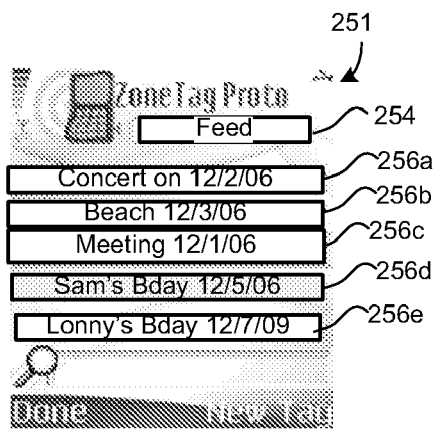
Figure 2E:
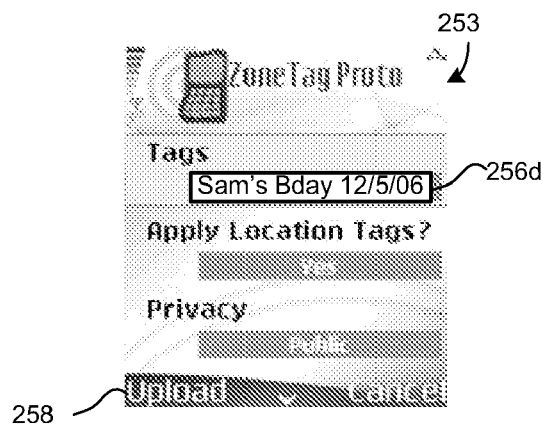

Any suitable tagging mechanism may be provided for the user. FIGS. 2C through 2E illustrate a plurality of screen shots from a feed tag application for allowing a user to associate one or more feed tags with a digital photo in accordance with a specific embodiment of the present invention. This feed tag application is utilized with respect to a currently captured photo object, such as a digital photo that has been obtained with a camera or camera-phone. Of course, these tagging techniques may be applied to other types of media objects. Also, the tagging techniques may be applied to previously captured media objects. However, a simplified tagging application may be configured to present a tag option for only the currently captured media object.

The screen shot 250 of FIG. 2C shows a user selecting a tags menu entry 252. The screen shot 251 of FIG. 2D illustrates a user then selecting a feed tab 254 to then display a plurality of feed tags (e.g., 256a~256e) which have been obtained from the previously selected feeds and their latest updates. The presented feed tags include a "Concert on Dec. 2, 2006" feed tag 256a, a "Beach Dec. 3, 2006" feed tag 256b, a "Meeting Dec. 1, 2006" feed tag 256c, a "Sam's Bday Dec. 5, 2006" feed tag 256d, and a "Lonny's Bday Dec. 7, 2006" feed tag 256e. As shown, the user has selected the "Sam's Bday Dec. 5, 2006" feed tag 256d, which is highlighted. FIG. 2E is a screenshot 253 showing the selected tag "Sam's Bday Dec. 5, 2006" feed tag 256d for the current media object.

The tagging application may simply present, to the user, all meta-data from all of the selected feeds that can serve as or enhance a description of a media object. Alternatively, the presented feed tags may be filtered based on any suitable factor, such as capture time or location of the media object. That is, a user may be presented with a particular set of feed tags based on a context of the currently captured media object and/or user. Similarly, the user may be presented with a prioritized list of feed tags with the most relevant feed tags presented first in the list based on user or object context. Context may include any suitable characteristic related to any combination of the following: an identity of the user, a location of the user, current time information (e.g., time and/or date), nearby Bluetooth identities which are transmitted using the Bluetooth radio frequency (RF) format, the user's social and/or physical relationship to other users, user history (e.g., a user's previous actions), one or more previous action(s) performed on the object, one or more other tag(s) that are already associated with the object, one or more other action(s) performed by one or more other user(s), etc. Although a user's or media object's context, e.g., time and/or location, may be obtained and used to present feed tags to a user or automatically associate a feed tag with a media object, a user's or media object's context need not be determined or obtained in order to practice techniques of the present invention.

In one example, the presented feed tags may be in the form of event descriptions obtained from an event or calendar feed, and these presented event descriptions may be filtered to only include events within a same time period as the captured media object. For instance, the events that have been scheduled in the user's calendar for a date that is the same date or within the same week of the media object's capture date may be presented as feed tags since the media object is more likely to have been captured at such set of events. The same week (or any other suitable time frame) may be utilized, instead of the same date, as the captured media object to account for the possibility that the user may be have delayed or moved up a particular event in time. In the Example of FIG. 2D, events that are scheduled for the first week of December 2006 are presented to the user as feed tags, for example, since the photo was captured in such first week of December and it is likely that the photo was taken at one of these events.

In another example, when the user (or the device that was used to capture the media object) is located near a particular location, feed tags that correspond to locations near the user's current location are presented since it is likely that the media object relates to such location. That is, the media object may represent a location that is near the user or media-capturing device, e.g., camera. If the user uses a camera device to capture a photo of a restaurant, for example, and then immediately selects a feed tag option, a feed tag that was obtained from a source, that lists restaurants or other places that are local to the user's current location (e.g., YAHOO! LOCAL), may be presented to the user as a tag selection option. Optionally, feed tags which correspond only to a user's designated favorite locations (e.g., favorite restaurants designated by the user in YAHOO! LOCAL) may be presented to a user when the user is near such favorite locations.

In an alternative example, meta-data from a weather source that is local to the user or the location where the media object was captured may be presented as feed tags in the form of weather descriptions of such location, e.g., sunny, rainy, cloudy, snowing, foggy, temperature, humidity, wind chill factor, wind speed, surf conditions, snowfall levels, pollen levels, smog levels, etc.

The user's location may be obtained in any suitable manner. In one implementation, the device used to capture or retain the media object may include a geographic positioning satellite (GPS) device. The user may also provide the location in any suitable manner. For example, the location of the user or media object may also be determined from a tag that corresponds to location that has been previously associated with such media object.

As an alternative to a user associating a feed tag with a media object, one or more feed tags may be automatically associated with one or more media objects. In one implementation, a user may set preferences for which feed tags are to be automatically associated with which media objects based on particular conditions, such as the time and/or location of the feed tag matching a time and/or location of the media object. In another embodiment, a feed tag may be automatically, without user intervention, associated with a particular media object based on a particular context, such as time or location, of such object. For instance, a feed tag that corresponds to a particular event of a particular date may be associated with any media object that has a creation date equal to the date of such event. Likewise, a feed tag that corresponds to a particular location, e.g., restaurant, may be associated with any media object that was captured at such particular location. A feed tag that corresponds to the local weather of the media object's location may also be associated with such object. Any of the above described mechanisms for automatically presenting feed tags may be utilized to automatically associate certain feed tags with certain media objects.

A feed tag may also be in the form of an identify of a meta-data object, such as a calendar event, and this meta-data identifier may be automatically or manually associated with a media object. The corresponding event or meta-data object may also be associated with the same media object. The meta-data identifier may later be used to organize the media objects based on the identifier, e.g., grouping by identifiers. In a further aspect, the meta-data identifiers may be used to pull media objects into the meta-data source and associate these media objects with the meta-data. For example, a calendar application may list all the media objects associated with a particular event identifier.

In a specific application, a user may utilize her camera or camera-phone to take a photograph and then add a feed tag to such photograph prior to uploading the tagged photo from her camera or camera-phone to a photo application. As illustrated in FIG. 2E, the user may select an "Upload" option 258. Of course, uploading of a tagged object to a server is not necessary to practice techniques of the present invention. Feed tags may be associated with objects that are to remain on a single device, such as a camera. Feed tags may be associated with objects that have already been uploaded to a user's computer system or a remote photo application server or that are already accessible by such server. In the latter example, the objects may have been previously stored at a particular location that is accessible by the photo application server and, accordingly, such objects may not be uploaded after tagging. In any of these examples, the process for associating feed tags with objects may be performed at the same location (or with respect to the same server) as the photo application or on any suitable device or computer system that is physically separate from the photo application.

Figure 3:
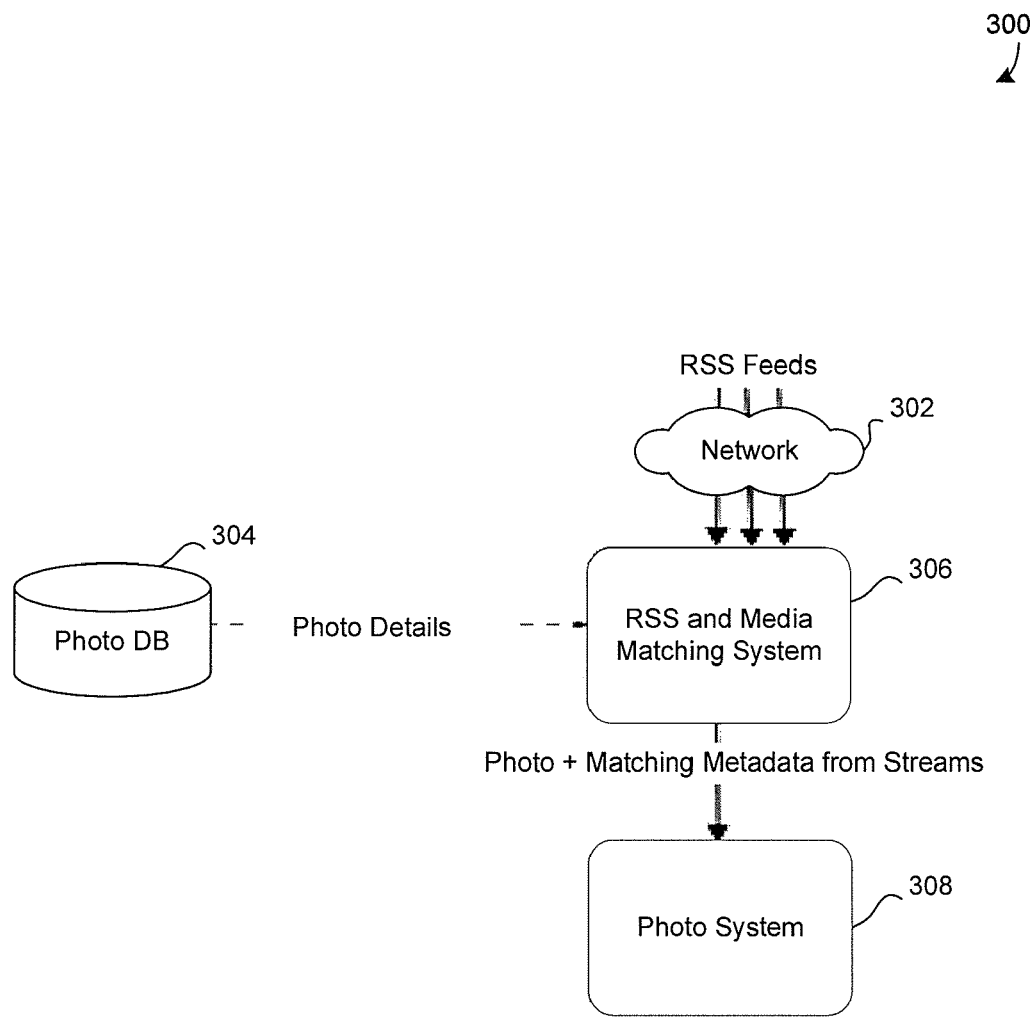
FIG. 3 illustrates a system for associating feed tags with a media object in accordance with a specific implementation of the present invention

FIG. 3 illustrates a system 300 for associating feed tags with a media object in accordance with a specific implementation of the present invention. As shown, the system 300 includes an RSS and Media Matching System 306 that is operable to allow a user to select a plurality of feeds 302 and/or automatically select one or more feeds. The RSS and Media Matching System 306 may be also operable to present meta-data from such selected feeds 302 for associating with one or more photo, e.g., from photo database 304. The system 300 may also include a Photo System 308 that is configured to facilitate various photo application functions, such as photo storage, organizing, or sharing. For example, the Photo System 308 may take the form of an on-line photo application, such as FLICKR available from YAHOO! Inc. of Sunnyvale, Calif. The illustrated components of system 300 may be integrated together in any combination or implemented separately. For instance, the feed tag mechanism may be integrated into the photo system application.

Embodiments of the present invention allow a user to tag their media objects with relevant and current meta-data. For example, a user can specify sources of meta-data in which they are interested or which pertains to events that are scheduled in the user's life. Additionally, this meta-data can be expanded easily using architecture embodiments of the present invention. In sum, a user can associate meta-data that pertains to a time, location, and/or context of the media object.

Figure 4:
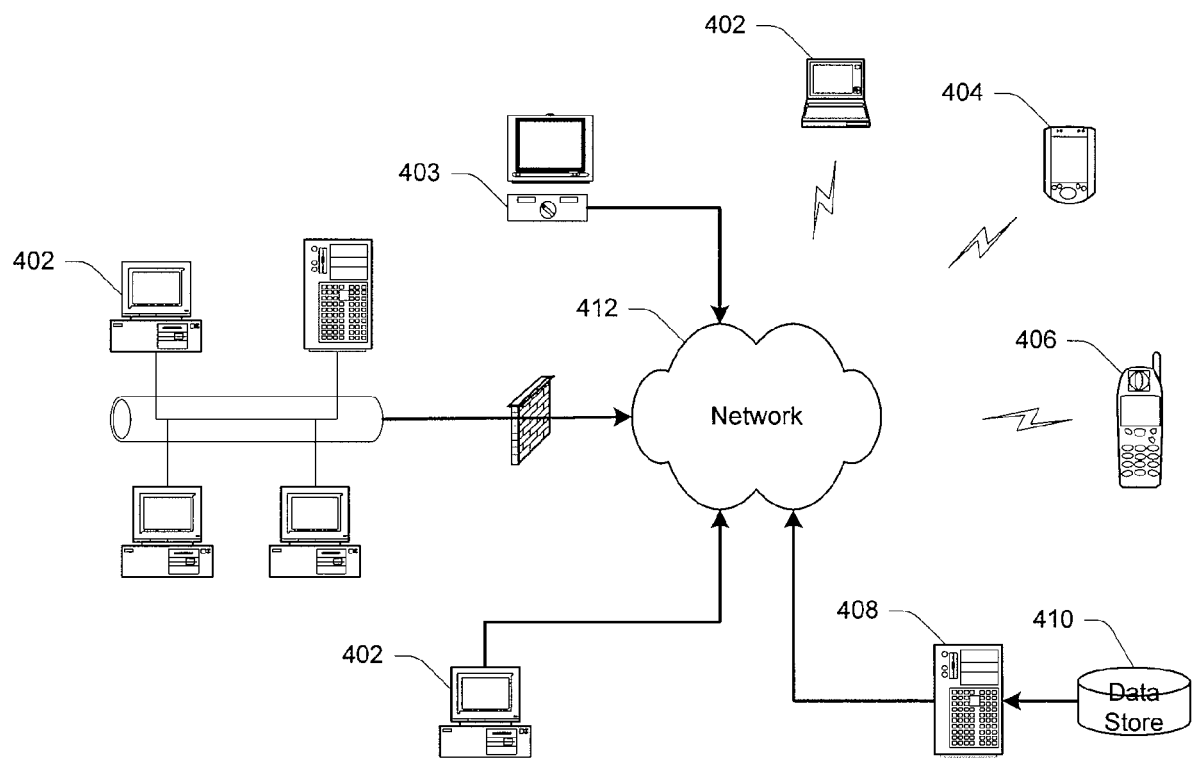
FIG. 4 is a simplified diagram of a network environment in which specific embodiments of the present invention may be implemented.

Embodiments of the present invention may be employed to utilize feed tagging in any of a wide variety of computing contexts. For example, as illustrated in FIG. 4, implementations are contemplated in which the relevant population of users interact with a diverse network environment via any type of computer (e.g., desktop, laptop, tablet, etc.) 402, media computing platforms 403 (e.g., cable and satellite set top boxes and digital video recorders), handheld computing devices (e.g., PDAs) 404, cell phones 406, or any other type of computing or communication platform.

And according to various embodiments, objects and their associated feed tags that are processed in accordance with the invention may be obtained using a wide variety of techniques. For example, feed tag associations representing a user's interaction with a local application, web site or web-based application, or service (e.g., associations between objects and their feed tags and their parameters) may be accomplished using any of a variety of well known mechanisms for recording a user's behavior. However, it should be understood that such methods of tagging are merely exemplary and that tagging information may be collected in many other ways. For example, tagging information for various objects may be collected when a user uploads objects or registers with, for example, a particular web site or service.

Once one or more feed tags are associated with one or more objects, tagged media objects may be handled according to the invention in some centralized manner. This is represented in FIG. 4 by server 408 and data store 410 that, as will be understood, may correspond to multiple distributed devices and data stores. The invention may also be practiced in a wide variety of network environments (represented by network 412) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Figure 5:
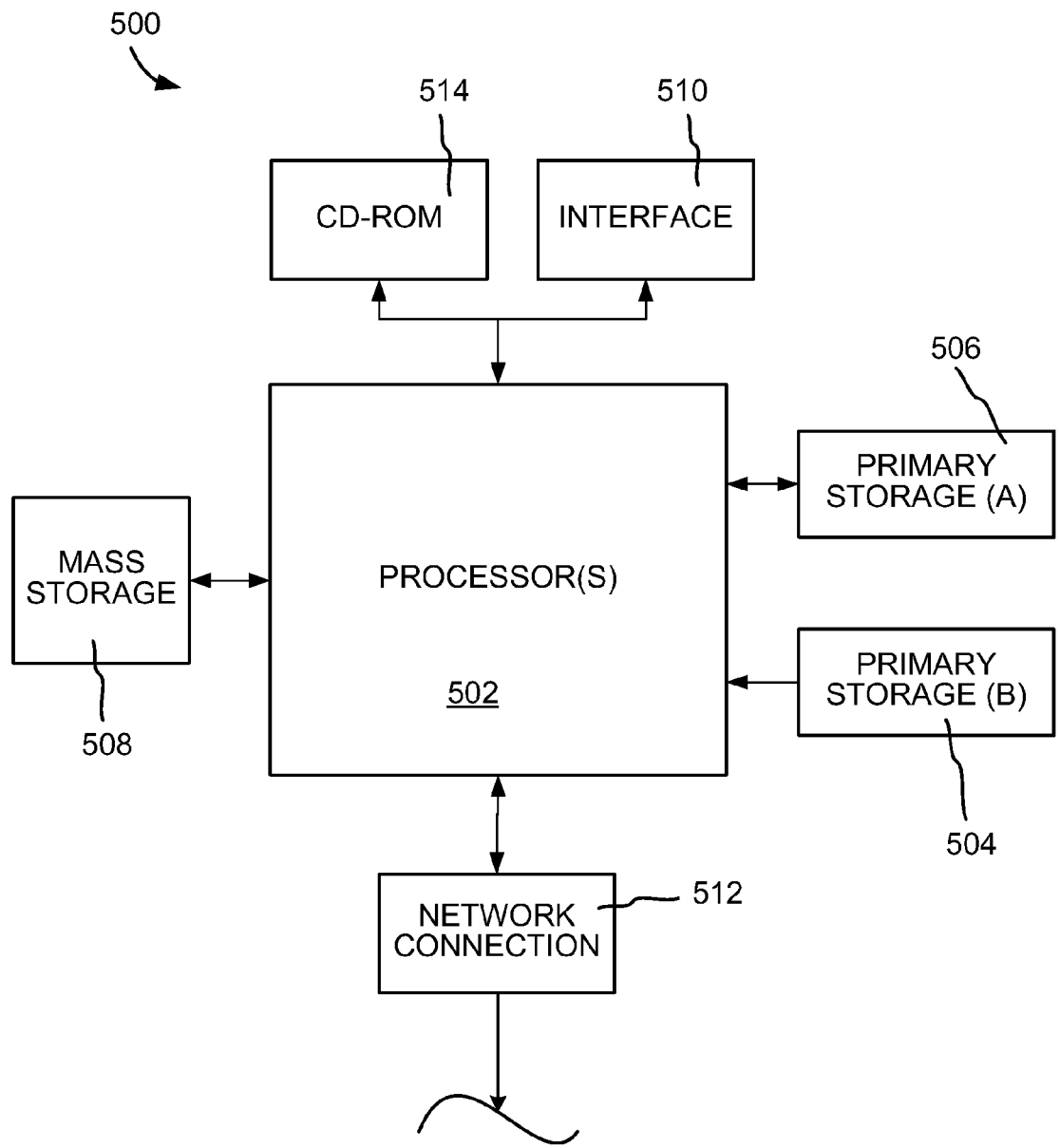
FIG. 5 illustrates a typical computer system that, when appropriately configured or designed, can serve as a feed selection and/or tag system of this invention.

FIG. 5 illustrates a typical computer system that, when appropriately configured or designed, can serve as a feed selection and/or tag system of this invention. The computer system 500 includes any number of processors 502 (also referred to as central processing units, or CPUs) that are coupled to storage devices including primary storage 506 (typically a random access memory, or RAM), primary storage 504 (typically a read only memory, or ROM). CPU 502 may be of various types including microcontrollers and microprocessors such as programmable devices (e.g., CPLDs and FPGAs) and unprogrammable devices such as gate array ASICs or general purpose microprocessors. As is well known in the art, primary storage 504 acts to transfer data and instructions uni-directionally to the CPU and primary storage 506 is used typically to transfer data and instructions in a bi-directional manner. Both of these primary storage devices may include any suitable computer-readable media such as those described herein. A mass storage device 508 is also coupled bi-directionally to CPU 502 and provides additional data storage capacity and may include any of the computer-readable media described above. Mass storage device 508 may be used to store programs, data and the like and is typically a secondary storage medium such as a hard disk. It will be appreciated that the information retained within the mass storage device 508, may, in appropriate cases, be incorporated in standard fashion as part of primary storage 506 as virtual memory. A specific mass storage device such as a CD-ROM 514 may also pass data uni-directionally to the CPU.

CPU 502 is also coupled to an interface 510 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to an external device such as a database or a computer or telecommunications network using an external connection as shown generally at 512. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store the media objects, selected feed identities and updated meta-data, tag associations between media objects and feed tags and other types of tags, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as air, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Although the above examples describe a user associating feed tags with his/her own media objects, of course, a user may also associate a feed tag with another user's media objects or with media objects that were automatically generated without a user. Therefore, the present embodiments are to be considered as illustrative and not restrictive and the invention is not to be limited to the details given herein, but may be modified within the scope and equivalents of the appended claims.

What is claimed is:

1. A method for associating meta-data from one or more customized feeds with media objects, comprising:
providing an interface for customized selection of an extensible set of one or more feeds for tagging media objects, wherein a plurality of types and remote sources of feeds are selectable via the interface;
in response to a user selecting a customized set of one or more selected feeds that is extensible by the user via the interface by entering a reference for each selected feed, obtaining and periodically updating a plurality of meta-data items by the one or more selected feeds, wherein the meta-data items are retrieved from a remote device and the meta-data items describe a characteristic of a plurality of different media objects;
in response to a user selecting a feed tagging option for a particular media object via a user interface of a computer device, filtering the obtained meta-data items based on a context of the particular media object and presenting the filtered meta-data items to the computer device for individual selection by the user for tagging a particular media object;
in response to the user selecting, via a user interface of the computer device, a selected portion of the filtered meta-data items or tagging the particular media object, tagging the particular media object with the selected portion of the filtered meta-data items and retaining an association between the selected portion of the filtered meta-data items and the tagged particular media object in a storage device; and
organizing the particular media object based on a meta-data identifier which is included in the selected portion of the filtered meta-data items.

2. A method as recited in claim 1, wherein selecting the one or more selected feeds is further performed by an automated entity and is further based on a user identity and its use with a particular computer implemented activity.

3. A method as recited in claim 2, wherein the particular computer implemented activity is one or more recent searches performed by a user associated with the user identity.

4. A method as recited in claim 2, wherein the particular computer implemented activity is one or more online scheduling services to which a user associated with the user identity subscribes.

5. A method as recited in claim 1, wherein the one or more selected feeds include a particular feed that originates from an online repository of scheduled events for a person, a group of people, or a local geographical area, wherein the meta-data items of this particular feed are in the form of event information.

6. A method as recited in claim 1, wherein the one or more selected feeds includes a weather website for providing weather that is local to a location and time of the particular media object, wherein the meta-data items from the weather website are in the form of weather descriptions.

7. A method as recited in claim 1, wherein the association between the selected portion of filtered meta-data items and the tagged particular media object is retained in a data structure.

8. A method as recited in claim 1, wherein each of the filtered meta-data items corresponds to a time or date range that encompasses a creation time or date of the particular media object.

9. A method as recited in claim 1, wherein each of the filtered meta-data items corresponds to a location that is proximate to a location at which the particular media object was captured.

10. A method as recited in claim 1, wherein the selecting of at least one of the filtered meta-data items is automatically performed based on a context of such particular media object.

11. A method as recited in claim 10, wherein the context is in the form of a creation time of the particular media object, a date of the particular media object, or a Bluetooth characteristic associated with the particular media object.

12. An apparatus comprising a processor, memory, and a display, the processor and memory being configured for:
providing an interface for customized selection of an extensible set of one or more feeds for tagging media objects, wherein a plurality of types and remote sources of feeds are selectable via the interface;
in response to a user selecting a customized set of one or more selected feeds that is extensible by the user via the interface by entering a reference for each selected feed, obtaining and periodically updating a plurality of meta-data items by the one or more selected feeds, wherein the meta-data items are retrieved from a remote device and the meta-data items describe a characteristic of a plurality of different media objects;

in response to a user selecting a feed tagging option for a particular media object via a user interface of a computer device, filtering the obtained meta-data items based on a context of the particular media object and presenting the filtered meta-data items to the computer device for individual selection by the user for tagging a particular media object;

in response to the user selecting, via a user interface of the computer device, a selected portion of the filtered meta-data items for tagging the particular media object, tagging the particular media object with the selected portion of the filtered meta-data items and retaining an association between the selected portion of the filtered meta-data items and the tagged particular media object in a storage device; and organizing the particular media object based on a meta-data identifier which is included in the selected portion of the filtered meta-data items.

13. An apparatus as recited in claim 12, wherein selecting the one or more selected feeds is further performed by an automated entity and is further based on a user identity and its use with a particular computer implemented activity.

14. An apparatus as recited in claim 13, wherein the particular computer implemented activity is one or more recent searches performed by a user associated with the user identity.

15. An apparatus as recited in claim 13, wherein the particular computer implemented activity is one or more online scheduling services to which a user associated with the user identity subscribes.

16. An apparatus as recited in claim 12, wherein the one or more selected feeds include a particular feed that originates from an online repository of scheduled events for a person, a group of people, or a local geographical area, wherein the meta-data items of this particular feed are in the form of event information.

17. An apparatus as recited in claim 12, wherein the one or more selected feeds includes a weather website for providing weather that is local to a location and time of the particular media object, wherein the meta-data items from the weather website are in the form of weather descriptions.

18. An apparatus as recited in claim 12, wherein the association between the selected portion of filtered meta-data items and the tagged particular media object is retained in a data structure.

19. An apparatus as recited in claim 12, wherein each of the filtered meta-data items corresponds to a time or date range that encompasses a creation time or date of the particular media object.

20. An apparatus as recited in claim 12, wherein each of the filtered meta-data items corresponds to a location that is proximate to a location at which the particular media object was captured.

21. An apparatus as recited in claim 12, wherein the selecting of the at least one of the filtered meta-data items is automatically performed based on a context of such particular media object.

22. An apparatus as recited in claim 12, wherein the context is in the form of a creation time of the particular media object, a date of the particular media object, or a Bluetooth characteristic associated with the particular media object.

23. At least one computer readable storage medium in the form of magnetic media, optical media, or magneto-optical media and having computer program instructions stored thereon for performing the following operations when executed by a processor:

providing an interface for customized selection of an extensible set of one or more feeds for tagging media objects, wherein a plurality of types and remote sources of feeds are selectable via the interface;

in response to a user selecting a customized set of one or more selected feeds that is extensible by the user via the interface by entering a reference for each selected feed, obtaining and periodically updating a plurality of meta-data items by the one or more selected feeds, wherein the meta-data items are retrieved from a remote device and the meta-data items describe a characteristic of a plurality of different media objects;

in response to a user selecting a feed tagging option for a particular media object via a user interface of a computer device, filtering the obtained meta-data items based on a context of the particular media object and presenting the filtered meta-data items to the computer device for individual selection by the user for tagging a particular media object;

in response to the user selecting, via a user interface of the computer device, a selected portion of the filtered meta-data items for tagging the particular media object, tagging the particular media object with the selected portion of the filtered meta-data items and retaining an association between the selected portion of the filtered meta-data items and the tagged particular media object in a storage device; and organizing the particular media object based on a meta-data identifier which is included in the selected portion of the filtered meta-data items.

24. At least one computer readable storage medium as recited in claim 23, wherein selecting the one or more selected feeds is further performed by an automated entity and is further based on a user identity and its use with a particular computer implemented activity.

25. At least one computer readable storage medium as recited in claim 24, wherein the particular computer implemented activity is one or more recent searches performed by a user associated with the user identity.

26. At least one computer readable storage medium as recited in claim 24, wherein the particular computer implemented activity is one or more online scheduling services to which a user associated with the user identity subscribes.

27. At least one computer readable storage medium as recited in claim 23, wherein the one or more selected feeds include a particular feed that originates from an online repository of scheduled events for a person, a group of people, or a local geographical area, wherein the meta-data items of this particular feed are in the form of event information.

28. At least one computer readable storage medium as recited in claim 23, wherein the one or more selected feeds includes a weather website for providing weather that is local to a location and time of the particular media object meta-data items from the weather website are in the form of weather descriptions.

29. At least one computer readable storage medium as recited in claim 23, wherein the association between the selected portion of filtered meta-data items and the tagged particular media object is retained in a data structure.

30. At least one computer readable storage medium as recited in claim 23, wherein each of the filtered meta-data items corresponds to a time or date range that encompasses a creation time or date of the particular media object.

31. At least one computer readable storage medium as recited in claim 23, wherein each of the filtered meta-data items corresponds to a location that is proximate to a location at which the particular media object was captured.

32. At least one computer readable storage medium as recited claim 23, wherein the selecting of at least one of the filtered meta-data items is automatically performed based on a context of such particular media object.

33. At least one computer readable storage medium as recited in claim 32, wherein the context is in the form of a creation time of the particular media object, a date of the particular media object, or a Bluetooth characteristic associated with particular the media object.

* * * * *